Patented Apr. 27, 1937

2,078,655

UNITED STATES PATENT OFFICE 2,078,655

PROCESS FOR BREAKING PETROLEUM EMULSIONS

Melvin De Groote, St. Louis, Mo., assignor to Tretolite Company, Webster Groves, Mo., a corporation of Missouri No Drawing. Application June 13, 1936, Serial No. 85,123

6 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil" and "bottom settlings".

The object of my invention is to provide a novel, inexpensive and efficient process for separating emulsions of the kind referred to into their component parts of oil and water or brine.

Briefly stated, my process consists of subjecting a petroleum emulsion to the action of a treating agent comprising an acid ester derived by reaction between a polybasic carboxy acid of relatively high acidity, and a single molecule of a monohydric alcohol. If a monohydric alcohol denoted by the formula D.OH is reacted with a polybasic carboxy acid of moderately high acidity, indicated by the formula $(HOOC)T(COOH)_n$ in which $n$ is the numeral one or two, then the acid ester so derived may be denoted by the formula $(D.OOC)T(COOH)_n$ in which $n$ represents the numeral one or two, T represents the polybasic carboxy acid residue, D the monovalent hydrocarbon radical derived from the monohydric alcohol, and (COOH) the conventional carboxy acid radical, and OOC is the conventional carboxy residue. The word "hydrocarbon" is used in its customary sense to mean a radical composed solely of the atoms of carbon and hydrogen.

Examples of such compounds which are available commercially or can be prepared by conventional methods, include propyl acid phthalate, butyl acid phthalate, amyl acid phthalate, ethyl mono-tartrate, monoethyl maleate, monoethyl phthalate, monomethyl phthalate, etc. Similarly, acid esters may be derived from aromatic alcohols such as benzyl alcohol, or the like. Benzyl acid phthalate may be prepared in the same manner that butyl acid phthalate is prepared. Presumably an aromatic or cyclic alcohol, such as cyclohexanol, would form acid phthalates or similar materials, just as readily as butyl alcohol. The expression "alcohol" is not intended to include hydroxy acids or the like.

It has been previously pointed out that the acid esters herein employed are derived from polybasic carboxy acids of the kind which exhibit relatively high acidity. Some of the so-called "fatty" polybasic carboxy acids, such as adipic acid, pimelic acid, suberic acid, etc., which are derived from fats, may be effective emulsion breakers in their various forms, but apparently such property is not related to the acidity of such dicarboxy acids. The dissociation constant or ionization constant K of such dicarboxy acids is in the approximate neighborhood of 3 or $3.5 \times 10^{-5}$ when measured at about 18–25° C.

I have found that, when one prepares the acid esters from polybasic acids whose acidity, measured in terms of the dissociation constant or ionization constant K, is in the neighborhood of $7 \times 10^{-4}$ or greater, that one obtains an effective demulsifier. The following table roughly expresses the ionization or dissociation constant K of various suitable polybasic acids measured at approximately 18–25° C.:

| | |
|---|---|
| Citric | $8 \times 10^{-4}$ |
| Fumaric | $1 \times 10^{-3}$ |
| Maleic | $1.5 \times 10^{-2}$ |
| Malic | $1.61 \times 10^{-3}$ |
| Oxalic | $3.8 \times 10^{-2}$ |
| Phthalic | $1.26 \times 10^{-3}$ |

It is to be noted that in all instances, the acidity is approximately 25 times as great as the acidity of such acids as adipic, suberic, pimelic, etc. It is understood that other suitable polybasic carboxy acids may be employed in the formation of esters suitable for use as demulsifying agents in my present process, and that those referred to above are for purposes of illustration only. For sake of simplicity, I will define the acidity of suitable acids as being at least equal to or greater than the acidity of citric acid.

My preferred reagents are the propyl, butyl, and amyl acid esters of phthalic acid, and I have found that butyl acid phthalate as available commercially is a very effective reagent on numerous emulsions. I have found, for example, that certain emulsions, for instance, many of the crude oil emulsions found in the Refugio Field, located approximately 40 miles northeast of Corpus Christi, Texas, are readily susceptible to treatment with butyl acid phthalate. This is unusual when one notes that butyl acid phthalate seems to be free from the properties often present in various types of demulsifying agents. Some demulsifying agents exhibit the properties of water softeners. Butyl acid phthalate is free from this property. Other demulsifiers exhibit the property of surface-active materials. Butyl acid phthalate appears to be entirely free from ordinary colloidal properties in the sense that it gives a molecular solution in water and not a colloidal solution. Demulsifying agents are frequently obtained from materials of rather high molecular weight, compared with butyl acid phthalate. Butyl acid phthalate serves as an excellent example to indicate that none of these properties must necessarily be present to give an effective demulsifier.

When some of the emulsions from the Refugio Oil Field previously referred to, are treated with phthalic acid or with butyl alcohol, they are not particularly changed. Furthermore, when treated with strong acids, such as hydrochloric acid, even in high concentration, such emulsions are not markedly modified or broken. In view of this fact, it appears unusual and unexpected that such emulsions should be susceptible to treatment with material of such simple structure as butyl acid phthalate.

It has been previously pointed out that the organic radical must be derived from monohydric alcohol. Hereinafter the word "alkyl" is employed to refer to a monovalent hydrocarbon radical derived from a monohydric alcohol, without differentiation as to whether it is aliphatic in nature or aromatic in nature. When the monovalent alcohol radical is aliphatic in nature, it will be referred to as being alphyl. When derived from an aromatic alcohol, it will be referred to as being aryl. This use of the word "alkyl" to indicate both types, provided that the radical is monovalent, is not unusual, although it is not ordinarily used. In regard to this particular usage, reference is made to "Textbook of Organic Chemistry", Bernthsen-Sudborough, reprinted 1933 edition, page 394, or "Textbook of Organic Chemistry", Schmidt-Rule, second revised English edition, 1932, page 97.

It will be noted that esters of the type described are generally water soluble, although at least in the case of the dicarboxy acids, where the size of the ester radical increases, for instance, in the hexyl or octyl radical, as compared with an ethyl radical, there is a tendency to decrease the solubility in water and one might even obtain esters which show at least some solubility in oil.

It is to be pointed out that the superiority of the reagent or demulsifying agent contemplated in my process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application so far as the majority of oil field emulsions are concerned; but I have found that such a demulsifying agent has commercial value, since it will economically break or resolve certain oil field emulsions in a number of cases which cannot be treated as easily or at so low a cost with the demulsifying agents heretofore available.

In practicing my process, a treating agent or demulsifying agent of the kind described above may be brought in contact with the emulsion to be treated in any of the numerous way now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc. may be employed as diluents. Miscellaneous solvents, such as pine oil, carbon tetrachloride, sulfur dioxide, extract obtained in the refining of petroleum, etc. may be employed as diluents.

Similarly, the acid esters employed as the demulsifying agents in my process may be admixed with one or more of the solvents customarily used in connection with conventional demulsifying agents, but generally speaking, the majority of such esters will be more apt to be soluble in materials such as alcohol, water, glycerine, ethylene glycol, glycol ethers, or the like. Those derived from aromatic acids such as phthalic acid or naphthalic acid may, in some instances, be soluble in aromatic solvents. Naturally, where the ester radical is derived from an aromatic source, such as the benzyl radical, the solubility in the aromatic vehicle is increased.

Generally speaking, these esters of the kind described may be employed in ratios of 1–3,000 or 1–5,000 or 1–8,000, based on the crude emulsion. In some instances, as in the case of refractory tank bottoms, the ratio may be decreased, and in other instances, the ratio may be increased, so that as little as one part of an ester to 10,000 parts of emulsion may be employed.

Having thus described my invention, what I claim as new and desire to secure by Letters Patent is:

1. A process for breaking petroleum emulsions of the water-in-oil type which consists in subjecting the emulsion to the action of a demulsifying agent comprising a chemical compound of the type $(D.OOC).T.(COOH)_n$ in which D is an alkyl hydrocarbon radical, T is a polybasic carboxy acid residue derived from an acid whose acidity is at least equal to that of citric acid, (COOH) is the conventional carboxy radical, OOC is the conventional carboxy residue, and $n$ indicates the numeral one or two.

2. A process for breaking petroleum emulsions of the water-in-oil type which consists in subjecting the emulsion to the action of a demulsifying agent comprising a chemical compound of the type (D.OOC).T.(COOH)$_n$ in which D is an aryl hydrocarbon radical, T is a polybasic carboxy acid residue derived from an acid whose acidity is at least equal to that of citric acid, (COOH) is the conventional carboxyl radical, OOC is the conventional carboxyl residue, and $n$ indicates the numeral one or two.

3. A process for breaking petroleum emulsions of the water-in-oil type which consists in subjecting the emulsion to the action of a demulsifying agent comprising a chemical compound of the type (D.OOC).T.(COOH)$_n$ in which D is an alphyl hydrocarbon radical, T is a polybasic carboxy acid residue derived from an acid whose acidity is at least equal to that of citric acid, (COOH) is the conventional carboxyl radical, OOC is the conventional carboxyl residue, and $n$ indicates the numeral one or two.

4. A process for breaking petroleum emulsions of the water-in-oil type which consists in subjecting the emulsion to the action of a demulsifying agent comprising a chemical compound of the type (D.OOC).T.(COOH), in which D is an alphyl hydrocarbon radical, T is an aromatic polybasic carboxy acid residue derived from an acid whose acidity is at least equal to that of citric acid, (COOH) is the conventional carboxyl radical, and OOC is the conventional carboxyl residue.

5. A process for breaking petroleum emulsions of the water-in-oil type which consists in subjecting the emulsion to the action of a demulsifying agent comprising a chemical compound of the type (D.OOC).T.(COOH), in which D is an alphyl hydrocarbon radical, T is a phthalic acid residue, (COOH) is the conventional carboxyl radical, and OOC is the conventional carboxyl residue.

6. A process for breaking petroleum emulsions of the water-in-oil type which consists in subjecting the emulsion to the action of a demulsifying agent comprising butyl acid phthalate.

MELVIN DE GROOTE.